UNITED STATES PATENT OFFICE.

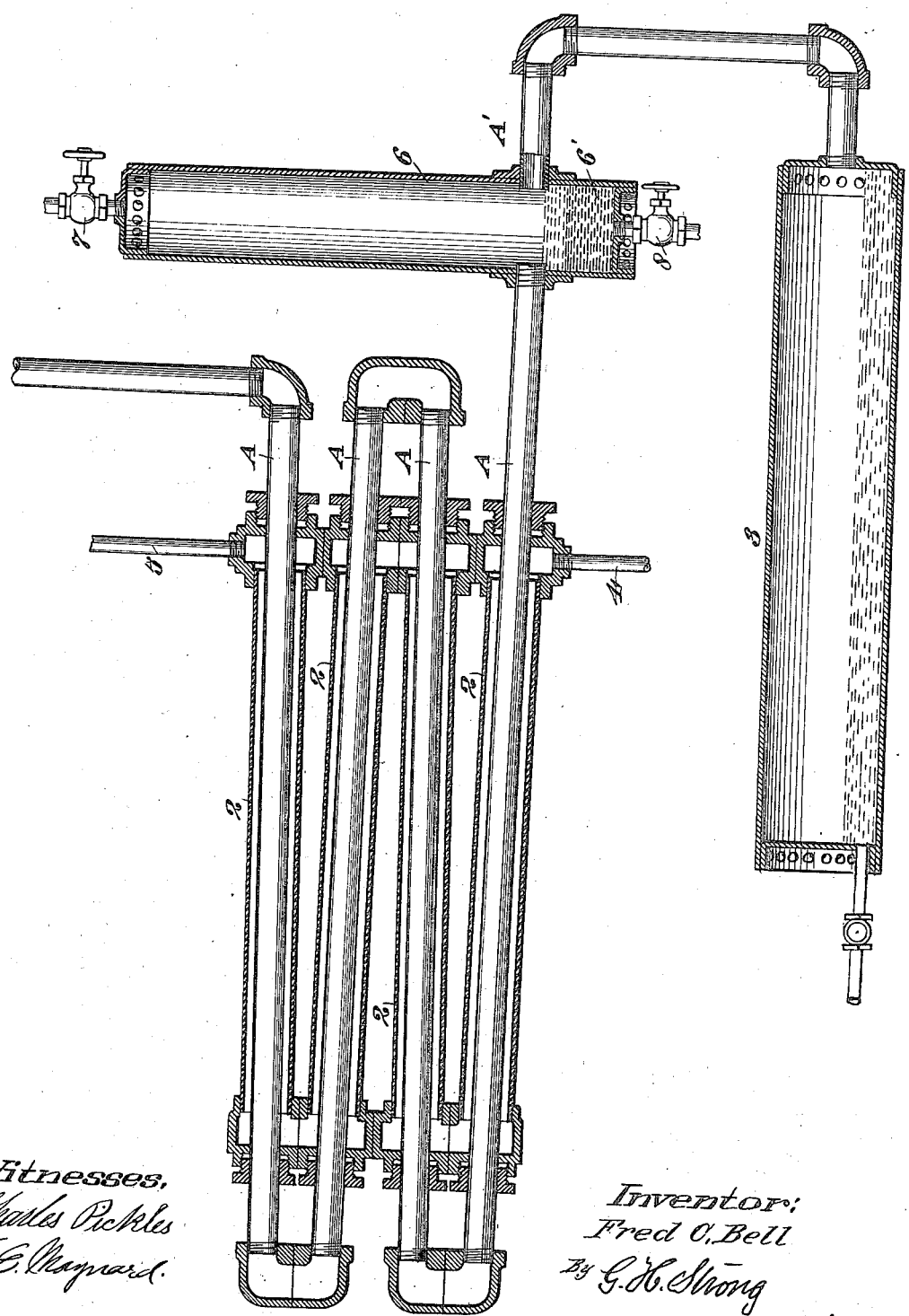

FRED C. BELL, OF ALAMEDA, CALIFORNIA, ASSIGNOR TO PACIFIC REFRIGERATING MACHINE COMPANY, OF SAN FRANCISCO, CALIFORNIA, A CORPORATION OF CALIFORNIA.

ACCUMULATOR AND SEPARATOR ATTACHMENT FOR GAS-LIQUEFYING APPARATUS.

1,024,433.      Specification of Letters Patent.      Patented Apr. 23, 1912.

Application filed September 6, 1910. Serial No. 580,592.

*To all whom it may concern:*

Be it known that I, FRED C. BELL, citizen of the United States, residing at Alameda, in the county of Alameda and State of California, have invented new and useful Improvements in Accumulator and Separator Attachments for Gas-Liquefying Apparatus, of which the following is a specification.
This invention relates to a gas liquefying apparatus and particularly pertains to an accumulator and separator attachment therefor.

It is the object of this invention to provide an attachment for gas liquefying apparatus for the purpose of separating and accumulating uncondensable gases and other foreign matters, and to provide means whereby these uncondensable gases and foreign matters may be removed while the apparatus is in operation, thus producing a continuously operating gas condensing or liquefying plant.

In the gas condensers or liquefiers now generally in use, there is always some gas present that is not liquefiable at the pressure and temperature necessary for the liquefaction of the gas that is being treated or operated on. For example: In working with ammonia gas the gas may be admitted into the condenser at the pressure of say 150 pounds and liquefaction takes place by the combined action of this pressure and the cooling medium provided by a water jacket or other suitable means, the resulting liquid flowing from the condenser to be used as desired. Entrained however, with these gases are other gases which are not condensable at the pressure and temperature operated under, and it is the object of the present invention to provide a suitable mechanism for separating and accumulating these uncondensable gases, and also oils and other liquids which may be condensed, but which do not mix with the unliquefied gas, and which it is desired to collect and separate from the liquefied gas. These liquid by-products may consist of oil, water or other liquids.

The invention consists of the parts and construction and combination of parts as hereinafter more fully described and claimed, having reference to the accompanying drawing, in which the figure is a vertical section of the invention as applied.

In the drawing A represents the gas condensing tubes or coils of a gas liquefying apparatus which pass back and forth through a series of water-jackets 2, the upper tube A entering the water-jackets 2 being connected with a suitable source of gas supply and the lower tube A leading to a vertically disposed cylinder 6 and thence to a liquid receiver 3 through a discharge pipe A'. The water-jacket 2 is connected to a water inlet 4 at its lower end and has a discharge outlet 5 at its upper end. In operating the condenser a continuous flow of water, of a suitable temperature is caused to circulate through the water-jacket 2 around the condenser tubes A so as to provide a cooling agency which tends to cause a condensation of certain gases within the tubes A; this condensed liquid accumulating in the bottom of cylinder 6 below the outlet A' and thence flowing out therethrough to receiver 3.

The present invention resides in disposing a vertical cylinder 6 in the liquid discharge pipe A' leading from the condenser tubes A, said cylinder 6 being a gas chamber of ample proportions above the inlet to permit of the ready separation of gases of different specific gravity into different strata, with means such as a valve 7 for drawing off the lighter gases from the top of the cylinder. The lower part of this vertical cylinder has a suitable liquid reservoir space 6' for the collection and separation of the liquid products, the heavier condensed matters being drawn off at the bottom from time to time through a valve 8, while the liquefied gases are allowed to flow on through the pipe A' to the receiver 3.

In practice, when the condenser A is working it will sometimes fill up with air, or other foreign gases, due to the operation of the pressure or some other unforeseen circumstances, and it then becomes necessary to get rid of this air or other gases, before condensation can take place. By disposing my condensing or separating cylinder 6 so that the lower part 6' is below the bottom drains A of the condensing apparatus, all uncondensable gases be they lighter or heavier than the gas to be condensed, are pushed forward through the condensing coils A by the pressure of the incoming gas, and are caused to enter the gas receiving chamber 6. This chamber 6 is of sufficient size and extent to allow a separation of the gases to take place and permit the uncondensable gases including air, etc., to be purged from the apparatus through a suitable valve, 7, while the machine is in operation. In fact, the chief feature of this invention is to provide a separating space, to-wit, chamber 6 in the system for the accumulation and separation of the uncondensable gases and other foreign media, and the removal of these uncondensable gases and foreign media from the system while the apparatus is in operation. The invention in fact, renders a continuously operating condensing plant. If no means are provided for the drawing of these uncondensable gases from the bottom tube A of the condenser they will accumulate to such an extent that the interior of the tubes A will become practically clogged and consequently the cooling surface will be so occupied by this uncondensable gas that no cooling space will be left to be operated on, resulting in the nullification or suspension of the condensing operations, and requiring a shutting down of the apparatus until the foreign gases can be purged from the pipes. This gas chamber or gas column is provided in the cylinder above the condensed liquid inlet.

The tendency of the uncondensable gases to rise in the cylinder 6 insures their not entering the liquid inlet pipe A' leading to the receiving tank 3.

Having thus described my invention, what I claim and desire to secure by Letters Patent, is—

1. An accumulator and separator for gas liquefying apparatus comprising a vertically disposed cylinder, an inlet to said cylinder connecting with a condenser, an outlet to said cylinder connected with a liquid receiver, said inlet and said outlet being disposed a substantial distance above the bottom of said cylinder, the space in the cylinder above the inlet and outlet forming a gas receptacle and the space below the inlet and outlet forming a liquid reservoir.

2. An accumulator and separator for gas liquefying apparatus, comprising a vertically disposed cylinder, an inlet to said cylinder connecting with a condenser, an outlet to said cylinder connecting with a liquid receiver, said inlet and said outlet being disposed a substantial distance above the bottom of said cylinder, the space in the cylinder above the inlet and outlet forming a gas receptacle, and the space below the inlet and outlet forming a liquid reservoir, a valved opening in the top of said cylinder for the escape of gases, and a valved opening in the bottom of said cylinder for the escape of liquid.

In testimony whereof I have hereunto set my hand in the presence of two subscribing witnesses.

FRED C. BELL.

Witnesses:
JOHN B. PENNYCOTT,
ROBERT P. NICHOLSON.